(12) United States Patent
Biechele et al.

(10) Patent No.: US 12,497,130 B2
(45) Date of Patent: Dec. 16, 2025

(54) SENSOR UNIT AND DRIVE DEVICE FOR AN ELECTRIC BICYCLE AND ELECTRIC BICYCLE

(71) Applicant: Porsche eBike Performance GmbH, Ottobrunn (DE)

(72) Inventors: Johannes Biechele, Ottobrunn (DE); Klaus Drost, Ottobrunn (DE); Julius Thorwart, Ottobrunn (DE)

(73) Assignee: Porsche eBike Performance GmbH, Ottobrunn (DE)

( * ) Notice: Subject to any disclaimer, the term of this patent is extended or adjusted under 35 U.S.C. 154(b) by 199 days.

(21) Appl. No.: 18/495,578

(22) Filed: Oct. 26, 2023

(65) Prior Publication Data
US 2024/0140557 A1    May 2, 2024

(30) Foreign Application Priority Data

Oct. 28, 2022   (DE) .......................... 102022128664.9

(51) Int. Cl.
| | |
|---|---|
| *B62M 6/60* | (2010.01) |
| *B62M 6/50* | (2010.01) |
| *H02K 5/20* | (2006.01) |
| *H02K 11/24* | (2016.01) |

(52) U.S. Cl.
CPC ................ *B62M 6/60* (2013.01); *B62M 6/50* (2013.01); *H02K 5/20* (2013.01); *H02K 11/24* (2016.01); *H02K 2211/03* (2013.01)

(58) Field of Classification Search
CPC ...... H02K 2211/03; H02K 5/20; H02K 11/24; B62M 6/60; B62M 6/50

USPC ........................................................ 310/67 R
See application file for complete search history.

(56) References Cited

U.S. PATENT DOCUMENTS

| | | |
|---|---|---|
| 11,781,590 B2 | 10/2023 | Rossberger |
| 2016/0137259 A1 | 5/2016 | Zhao et al. |
| 2023/0106924 A1 | 4/2023 | Nishimori et al. |

FOREIGN PATENT DOCUMENTS

| | | | | |
|---|---|---|---|---|
| CN | 214648833 U | * | 11/2021 | |
| CN | 111982370 B | * | 4/2022 | ............ B62M 11/33 |
| CN | 116654154 A | * | 8/2023 | ............ B62J 45/411 |
| DE | 102016122845 A1 | | 5/2018 | |
| DE | 102021209318 A1 | * | 3/2023 | ............ H02K 11/33 |
| EP | 3790171 A1 | | 3/2021 | |
| WO | WO-2023212241 A1 | * | 11/2023 | ............ G01N 11/14 |

* cited by examiner

*Primary Examiner* — Jose A Gonzalez Quinones
(74) *Attorney, Agent, or Firm* — Slater Matsil, LLP

(57) ABSTRACT

In an embodiment a sensor unit includes a hub axle connectable to an electric motor of a drive device of an electric bicycle, a housing element rotatable about an axis of rotation and configured to form a part of a motor housing for the electric motor, wherein the housing element is coupled to the hub axle and comprises an opening through which the hub axle extends and a first printed circuit board and a second printed circuit board configured to determine a torque of a rider of the electric bicycle and are coupled to one another in terms of signal technology, wherein the printed circuit boards are coupled to the hub axle on opposite sides of the housing element and at least partially surround the hub axle with respect to the axis of rotation.

15 Claims, 5 Drawing Sheets

SENSOR UNIT AND DRIVE DEVICE FOR AN ELECTRIC BICYCLE AND ELECTRIC BICYCLE

CROSS-REFERENCE TO RELATED APPLICATIONS

This application claims the priority of German application no. 102022128664.9, filed on Oct. 28, 2022, which application is hereby incorporated herein by reference.

TECHNICAL FIELD

The invention relates to a sensor unit for a drive device for an electric bicycle. The invention further relates to a drive device and an electric bicycle having such a sensor unit.

BACKGROUND

Bicycles realize low-cost, easy-to-use and emission-free means of transportation. They have also found widespread use as sports or fitness equipment, and particularly suitable types have emerged for various fields of application.

In recent years, there has been growing enthusiasm for electric bicycles, especially so-called "pedelecs," despite their high weight and price for bicycles. Potential customers are not only older cyclists who are less fit or free of sporting ambitions, but also sporty, younger riders, whether for use on the way to work or because of the possibility of using them to extend the radius of action and/or increase the speed of travel without overstraining one's own physique. Among mountain bikers in particular, interest in electrically assisted mountain bikes seems to be growing. In the case of electric bicycles, it is a challenge to provide a reliably assisting drive system that allows high power transfer.

SUMMARY

Embodiments provide a reliable drive system for electric bicycles, which allows a clear structure and also contributes to a high power transmission.

According to one embodiment, a sensor unit for a drive device for an electric bicycle is disclosed. The sensor unit includes a hub axle couplable to an electric motor of the drive device, and a housing element rotatable about an axis of rotation and adapted to form part of a motor housing for the electric motor of the drive device. The housing element is coupled to the hub axle and includes an opening through which the hub axle extends. The sensor unit further comprises a first printed circuit board and a separate second printed circuit board, which are configured to determine a torque of a rider of the electric bicycle and are coupled to each other for signalling purposes. The printed circuit boards are coupled to the hub axle on opposite sides of the housing element and surround it at least in sections with respect to the axis of rotation.

By means of the described sensor unit, a clear and slim design of a drive device can be realized, which forms a reliable drive concept for electric bicycles and, in particular, enables an efficient rear wheel hub drive. Due to the divided or spatially separated printed circuit boards, a particularly narrow structure of the drive device can be set up, for example in the area of a cassette body, which enables improved integration of torque sensors. One printed circuit board comprises, for example, sensor technology and evaluation electronics for determining a respective torque and the other printed circuit board is equipped, for example, only with one or more coils and a Hall sensor and can therefore be implemented in a particularly clear, flat and space-saving manner. The sensor unit described is provided for a drive device which is suitable in particular as an electric bicycle drive system on a bicycle hub or a rear wheel of an electric bicycle.

It is a finding in connection with the present invention that a performance of rear wheel hub motors in electric bicycles is particularly dependent on the installed sensor system. With the help of a torque sensor, a riding performance can be significantly improved. By means of the described sensor unit and the corresponding drive device as well as the associated electric bicycle, a concept for integrating a magnetostrictive torque sensor in a freewheel body of a rear wheel hub drive can be realized in each case, which can contribute to an improved driving performance of a rider of the electric bicycle.

According to a preferred embodiment, the sensor unit has a measuring sleeve which is made of steel and is permanently magnetized. Alternatively, the measuring sleeve can also be ferromagnetic and electrically magnetizable by one or more coils. A torsional moment twists the measuring sleeve so that the magnetic field in the measuring sleeve changes. Such a magnetic field change is proportional to the torque and can be detected with the aid of coils in the sensor electronics. The sensor unit is therefore preferably based on a magnetostrictive measuring principle.

The measuring sleeve can further be coupled on the one hand to the housing element and on the other hand to a magnetic pole ring element, which are rotatable about the axis of rotation and through which the hub axle extends. The measuring sleeve surrounds the first printed circuit board, so that the first printed circuit board is arranged between the measuring sleeve and the hub axle with respect to a radial direction transverse to the axis of rotation.

According to a further embodiment of the sensor unit, the first printed circuit board comprises at least a coil and a Hall sensor, which are arranged in cooperation with the pole ring element in an operation of the drive device for determining a torque of a rider of the electric bicycle.

Further, the sensor unit or the corresponding drive device may comprise a cassette body coupled to the housing element and surrounding the hub axle with respect to the axis of rotation and adapted to transmit a torque of a rider of the electric bicycle to the housing element. The cassette body surrounds the measuring sleeve and the first printed circuit board. Accordingly, with respect to a radial direction transverse to the axis of rotation, the measuring sleeve and the first printed circuit board are arranged between the cassette body and the hub axle.

Due to the slim and clear structure of the first printed circuit board within the measuring sleeve, this and the adjacent cassette body can be made slim or narrow and thus contribute to a correspondingly space-saving structure of the drive device. The first printed circuit board is arranged on the side of the housing element which forms an outer side of the motor housing of the drive device. The first printed circuit board can therefore also be referred to as an outer printed circuit board and is provided to enable determination of a rotational speed or torque of the cassette body.

According to a further embodiment of the sensor unit, the second printed circuit board is coupled to or faces an inner side of the housing element which, with respect to a state in which the sensor unit is installed in the drive device, delimits an inner space of the motor housing. In particular, the housing element forms a lateral wall of the motor housing and can be regarded as a component of the sensor unit and/or the motor housing and/or the drive device. In particular, the sensor unit may be connected to the other components of the drive device as a completed assembly.

Accordingly, the second printed circuit board is associated with the motor housing and positioned in the drive device within the motor housing. The second printed circuit board can therefore also be referred to as an inner printed circuit board and is provided to enable determination of a rotational speed or torque of the motor housing. For this purpose, the second printed circuit board has, for example, a Hall sensor which interacts with a magnet which is arranged or integrated in a predetermined manner on the inner side of the housing element. The Hall sensor of the second printed circuit board and the magnet are arranged to enable determination of a torque of a rider of the electric bicycle during operation of the drive device.

According to a further embodiment of the sensor unit, the second printed circuit board is annular and surrounds the hub axle at least in sections with respect to the axis of rotation. Thus, the second printed circuit board can be positioned around the hub axle on the inside of the motor housing to save space. The second printed circuit board can thereby realize the form of a circular or ring segment or form a self-contained ring which has at least one opening through which the hub axle extends.

According to a further embodiment of the sensor unit, the first and second printed circuit boards are connected to each other in the area of the opening of the housing element by means of a coupling interface in terms of signal technology. For example, the first printed circuit board can be arranged on the hub axle and surrounded by the measuring sleeve, while the second printed circuit board is coupled to the inside of the housing element. Thereupon, the hub axle with the first printed circuit board and the measuring sleeve can be inserted through and coupled to the housing element. Furthermore, the two printed circuit boards are brought into signal and/or power supply connection with each other by means of electrical lines and the coupling interface.

According to a further embodiment of the sensor unit, the hub axle along the axis of rotation has a first end section, a second end section and a middle section formed therebetween. The end portions are adapted to be coupled to a respective frame member on opposite sides with respect to the axis of rotation. The middle section is formed at least narrower than one of the end sections and is preferably adapted to the arrangement of the first printed circuit board. The first printed circuit board can therefore be arranged in the narrower middle section in a particularly space-saving manner and contribute to a slim structure of the drive device.

For example, the middle section has a flattened rectangular section formed to match one or more components of the first printed circuit board. Such a flattened section may also be formed in a different shape to beneficially provide space for one or more components of the first printed circuit board. At least in the flattened section, the middle section is made narrower than the adjacent end sections. For example, the first end section is formed as an M12 section and the second end section is formed as an M10 section and the middle section predominantly follows the course and diameter of the second end section but has at least the narrower flattened section so that the hub axle tapers inwardly from 12 mm diameter and 10 mm diameter. Alternatively, other diameter values may be provided.

The end sections may be threaded and bolted to the associated frame members. Alternatively or additionally, separate threaded elements, for example as steel inserts, can be provided between the hub axle and the frame elements to enable reliable connection and clamping of the components of the drive device. By designing the hub axle to be tapered and to have a narrower section, installation space can be provided that is particularly suitable for the first printed circuit board.

The described sensor unit and the corresponding drive device provide additional installation space due to the separate arrangement of the printed circuit boards, in particular with regard to an outer diameter and an axial length, and are therefore compatible with common freewheel body standards and, for example, with 12-slot freewheel bodies. In addition, the sensor unit and the drive device allow for an assembly with a relatively small inner diameter and are compatible with a quick-release axle as a component of the hub axle, which enables a simple and reliable assembly of the drive device for an electric bicycle.

In addition, the configuration described makes it possible to accommodate a torque sensor in a freewheel body, i.e. outside the actual drive or motor housing, so that falsification of measurement results due to interference from the electric motor can be prevented or at least counteracted.

The sensor unit enables reliable power measurement, which is related to or processed by the operation of the electric motor to provide a reliable and efficient electric bicycle drive. For example, the first printed circuit board is plate-shaped and/or sleeve-shaped in order to be reliably and stably arranged in the narrow installation space. In particular, a shape of the first printed circuit board and the hub axle are formed to match each other to enable a narrow and space-saving structure of the drive device. For example, the hub axle is further made of a particularly stable material in order to be able to reliably accommodate the sensor unit or the first printed circuit board and to provide a required stability of the drive device.

According to a further embodiment, a drive device is disclosed comprising a motor unit having an electric motor for driving the electric bicycle and a gearbox configured to drive the electric bicycle and rotatable about an axis of rotation. The gearbox is coupled on the one hand to the electric motor and on the other hand to the hub axle or is mounted on the hub axle. The gearbox is configured to output a torque for driving the electric bicycle. The drive device further comprises a motor housing in which the electric motor and the gearbox are arranged. The drive device further comprises an embodiment of the previously described sensor unit coupled to the electric motor by means of the hub axle, wherein the housing element establishes a part of the motor housing and the hub axle extends through the motor housing.

Preferably, the gearbox is formed as a planetary gear with a sun gear and at least one planetary gear and is arranged coaxially around the hub axle with respect to the rotation axis, so that the planetary gear surrounds the hub axle. The drive is provided by the sun gear, which is pressed, for example, into a motor shaft of a rotor of the electric motor. The planet gear meshes with the sun gear on the motor side and a ring gear surrounding it, which is connected to the motor housing and does not rotate. The output is provided by a planet carrier. A sprag freewheel, for example, is arranged between the planet carrier and the motor housing. The sprag freewheel ensures that the drive does not have to be dragged along when the electric bicycle is being ridden without motor assistance. Furthermore, the gearbox can be of two or more stages, so that one or more sun gears and/or planet carriers can be provided.

In that the drive device comprises an embodiment of the sensor unit described above, the properties and features described in connection with the sensor unit are also disclosed for the drive device, and vice versa.

According to a further embodiment of the drive device, the electric motor comprises a rotor and a stator. Preferably, the stator is arranged in direct proximity to a wall of the motor housing so that heat generated during operation can be reliably dissipated. Preferably, the electric motor is designed as a ring motor coaxially around the hub axle. The hub axle can form a bearing seat for the planetary gear and/or the ring motor. In this way, one or both components can be arranged radially and in a particularly space-saving manner, for example by coupling them to the hub axle using ball and/or roller bearings.

In particular, the stator is a component of the electric motor which generates a relatively large amount of heat during operation and is therefore preferably located in the vicinity of a heat-dissipating wall. The rotor and/or the stator of the electric motor can be arranged on the wall of the motor housing or connected to it by means of an intermediate element, so that a material-guided heat conduction is set up through the wall into the outer area. Such a material-guided heat conduction is preferably formed in one piece. Alternatively, the wall and the further heat-conducting elements, which are connected to the wall in particular without air, can form a continuous heat conduction without an air gap in between.

According to a further embodiment of the drive device, the motor housing has a cooling structure with a plurality of fins which are formed spaced apart from one another on an outer side of the motor housing. Thus, heat generated during operation can be dissipated even more efficiently to the outside.

According to a further embodiment of the drive device, the motor housing is formed in two parts and has a circumferential housing section and a stator cover which are coupled to one another rotatably with respect to the axis of rotation by means of a bearing. With respect to the axis of rotation, the stator cover is rotationally fixed and the housing section is rotationally coupled to the hub axle. The stator cover extends axially along the axis of rotation to outside the housing section.

The circumferential housing section comprises the housing element of the sensor unit and rotates about the axis of rotation, which in particular also corresponds to an axis of symmetry or longitudinal axis of the hub axle, in an operation of the drive device during a ride with the electric bicycle. The hub axle is stationary or rotationally fixed relative to the rotatable housing section, and is used in particular to hold the components and to attach the drive device to the electric bicycle.

By means of the multi-part motor housing, the stator cover with the stator or electric motor located therein can be moved closer to the outer area and thus cooled more effectively. The electric motor is thus not isolated and shielded from the outside area by a stator cover and a housing and, if necessary, elements and/or air gaps arranged in between, but can transfer heat promptly and effectively to the wall of the stator cover, which in turn conducts the heat to the outside area by means of heat conduction and releases it to the ambient air.

In addition, the drive device may include a brake disc for braking the electric bicycle as needed, which is fixedly coupled to the circumferential housing portion. The brake disc then preferably has an axial or internal penetrating recess through which the stator cover extends axially along the axis of rotation. The stator cover can thus extend through the housing section and through the brake disc to the exterior and provide reliable cooling of the electric motor, which typically forms the primary heat source of the drive device. The stator cover and the electric motor are thus axially displaced, thereby also providing available installation space in the housing section that can be used for further components of the drive device.

According to a further embodiment, the drive device comprises a first and a second frame member arranged on opposite sides outside the motor housing with respect to the axis of rotation and surrounding the hub axle. The hub axle is formed in two parts and has a stub axle and a drive axle, and the two frame members are arranged and formed to preliminarily clamp the drive axle in cooperation with the stub axle.

The stub axle and the drive axle are elements that can be coupled to one another and can be solid or sleeve-shaped or hollow. In particular, the stub axle is longer than the surrounding drive axle so that it protrudes from both sides of the drive axle. Thus the stub axle can be coupled, in particular bolted, to the frame elements and the drive axle can be braced in a predetermined manner. The drive axle serves in particular as a stabilizing retaining element for the components of the drive device surrounding it. In addition, the hub axle can also be of three-part, four-part or multi-part design and have elements that can be plugged into one another or coupled to one another.

With respect to embodiments of the gearbox as a planetary gear and the motor unit as a ring motor, these components may be plugged or slid onto the drive axle before the plug-in axle is passed therethrough so that an assembly may be provided and subsequently coupled to the bicycle frame. Accordingly, a method of manufacturing the drive device may include providing and coupling the respective components. For example, the electric motor is slid onto the drive axle as a ring motor and thereupon the planetary gear is also arranged axially adjacent thereto. Subsequently, the assembly can be placed on the rear bicycle tire and the stub axle inserted through it and bolted to the frame elements. Alternatively, a different order of assembly may be carried out so that, for example, the stub axle is first inserted through the drive axle or the assembly, thereby forming the drive device, which is then bolted to the frame elements by means of the end portions of the stub axle.

The sensor unit of the drive device includes selective separation of the sensor electronics into a primary sensor, for example, arranged on the first printed circuit board inside the measuring sleeve, and signal processing and conditioning electronics outside the measuring sleeve, formed on the second printed circuit board. The second circuit board may optionally further comprise a Hall sensor or speed sensor for determining a speed of the rear wheel of the electric bicycle. Such a speed sensor can be precisely formed by means of poles in a pole ring, for example, by gluing permanent magnets in predetermined positions or by arranging a pole ring in a predetermined manner.

The electrical separation between the inner and outer printed circuit board allows a high level of integration while still saving time in assembly. In addition, it is possible to accommodate further sensors on the printed circuit boards, in particular the inner, second printed circuit board, which, for example, enable temperature measurement or inclination determination for the electric bicycle.

The described drive device enables one or more of the following advantages:
    compatibility with thru axles
    compatibility with 12-speed freewheel bodies
    additional integration of a second speed sensor sensor technology in the freewheel body and thus protected from interference from the motor unit space-saving advantage, since the sensor technology is accommodated in the freewheel body in a space-saving manner or is reduced to a few elements within the measuring sleeve and the cassette body, so that installation space inside the drive can be used for further components, for example the motor unit or the gearbox.

According to further embodiment, an electric bicycle is disclosed comprising a bicycle frame extending to a bottom bracket and a bicycle hub. The electric bicycle includes a drive device according to any of the previously described embodiments disposed in or on the bicycle hub, such that torque is transmittable by means of the gearbox to drive the electric bicycle. The electric bicycle substantially enables the aforementioned features, benefits, and functions.

For example, for attachment to the bicycle hub and optionally to a frame portion of the electric bicycle, the bicycle hub has a recess so that the drive device can be reliably received. According to one embodiment, the drive device is arranged, for example as an assembly in the already coupled state on the bicycle hub, in particular mounted, or forms the same.

BRIEF DESCRIPTION OF THE DRAWINGS

Embodiments, advantages and functions are explained in the following description with reference to embodiment examples with the aid of the attached figures.

DETAILED DESCRIPTION OF ILLUSTRATIVE EMBODIMENTS

Identical, similar or similarly acting elements are provided with the same reference signs in the figures. For reasons of clarity, not all elements shown in all figures are marked with the corresponding reference signs, possibly.

Figure 1:
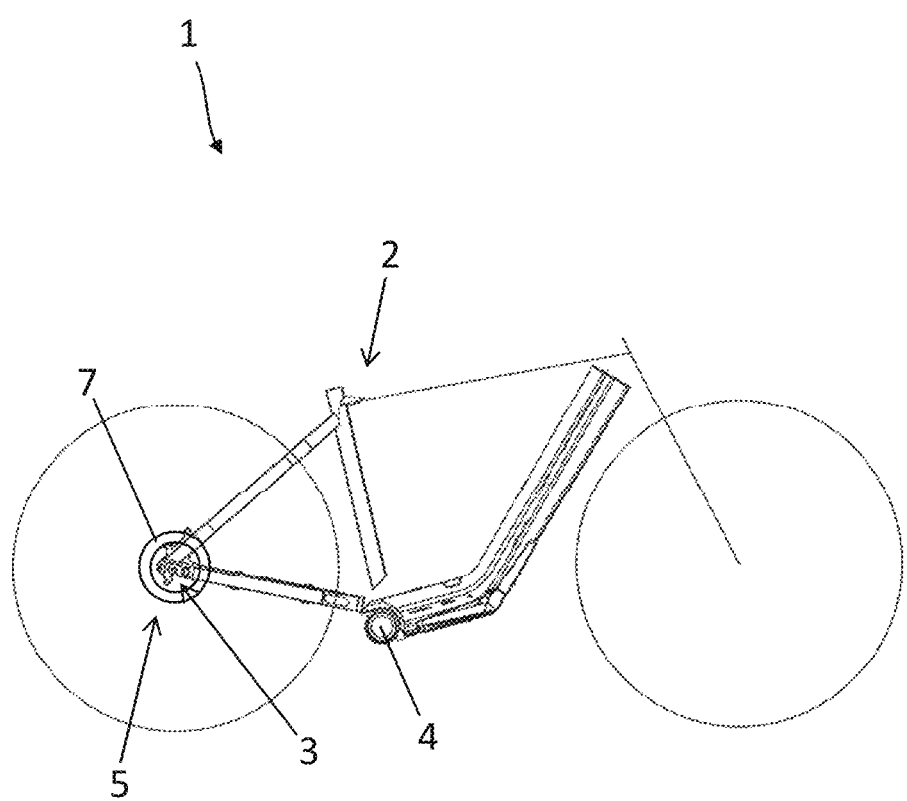
FIG. 1 shows a schematic view of an electric bicycle with a mounted drive device.

FIG. 1 schematically shows an electric bicycle 1 with a bicycle frame 2, which extends in the direction of a bottom bracket 4, and in the direction of a rear bicycle hub 3. The bicycle hub 3 is coupled or couplable to an electric drive device 5 for the electric bicycle 1.

Terms such as "front", "rear", "top", "bottom", "right", "left", "outside" and "inside" refer to orientations or alignments of respective components as illustrated in the figures and as arranged in an operational state of the electric bicycle 1. The electric bicycle 1 generally includes a front wheel and a rear wheel. An outer area refers to an area outside the electric bicycle 1 or outside the drive device 5 or a motor housing, respectively. The drive device 5 may also be referred to as a rear hub drive and is integrated into or arranged on the rear bicycle hub 3, and transmits a provided driving force to the bicycle hub 3 with almost no loss. The running wheels of the electric bicycle 1 are directly set in motion by the drive device 5, so that a high efficiency can be achieved by means of the rear hub drive to assist a rider of the electric bicycle 1.

As explained with reference to the following embodiments and FIGS. 2-5, the drive device 5 enables a drive concept for electric bicycles that has a clear and space-saving structure and also contributes to high power transmission.

Figure 2:
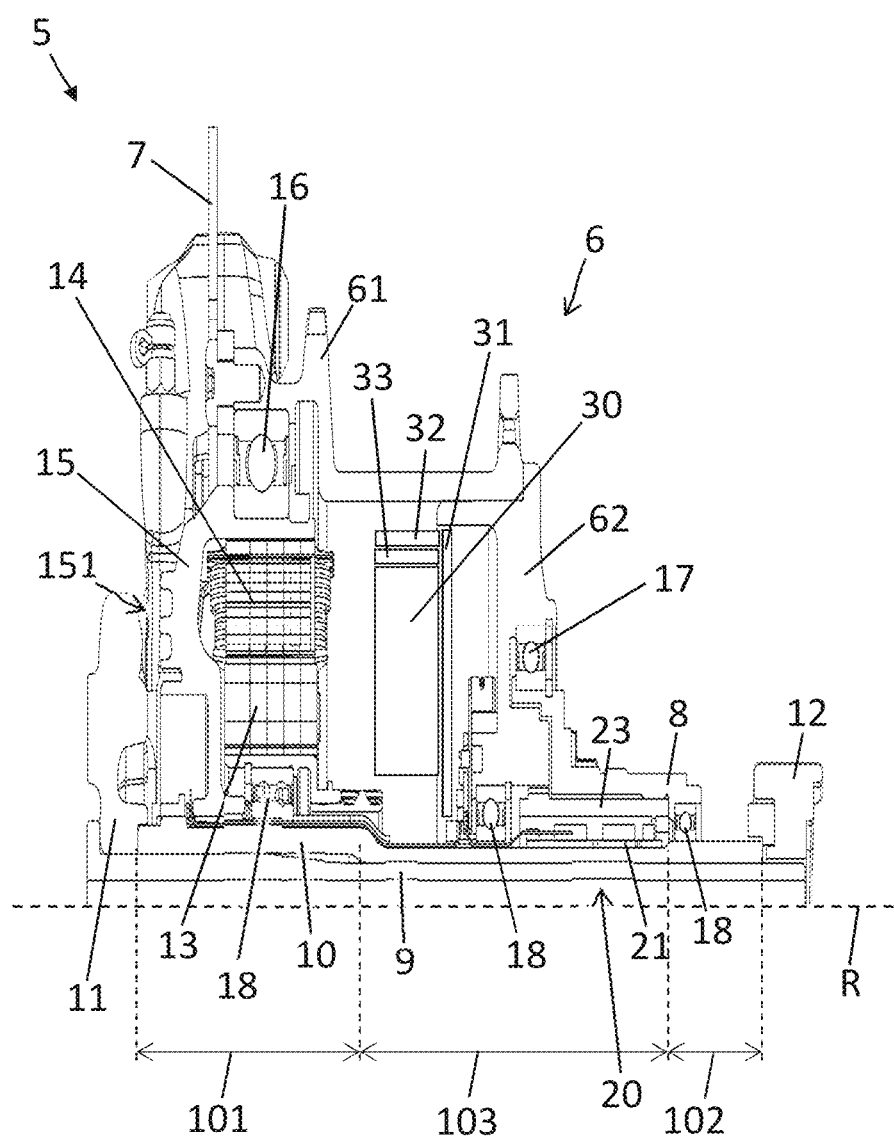
FIGS. 2-5 show an embodiment example of the drive device with a sensor unit for the electric bicycle in different views.
Figure 3:
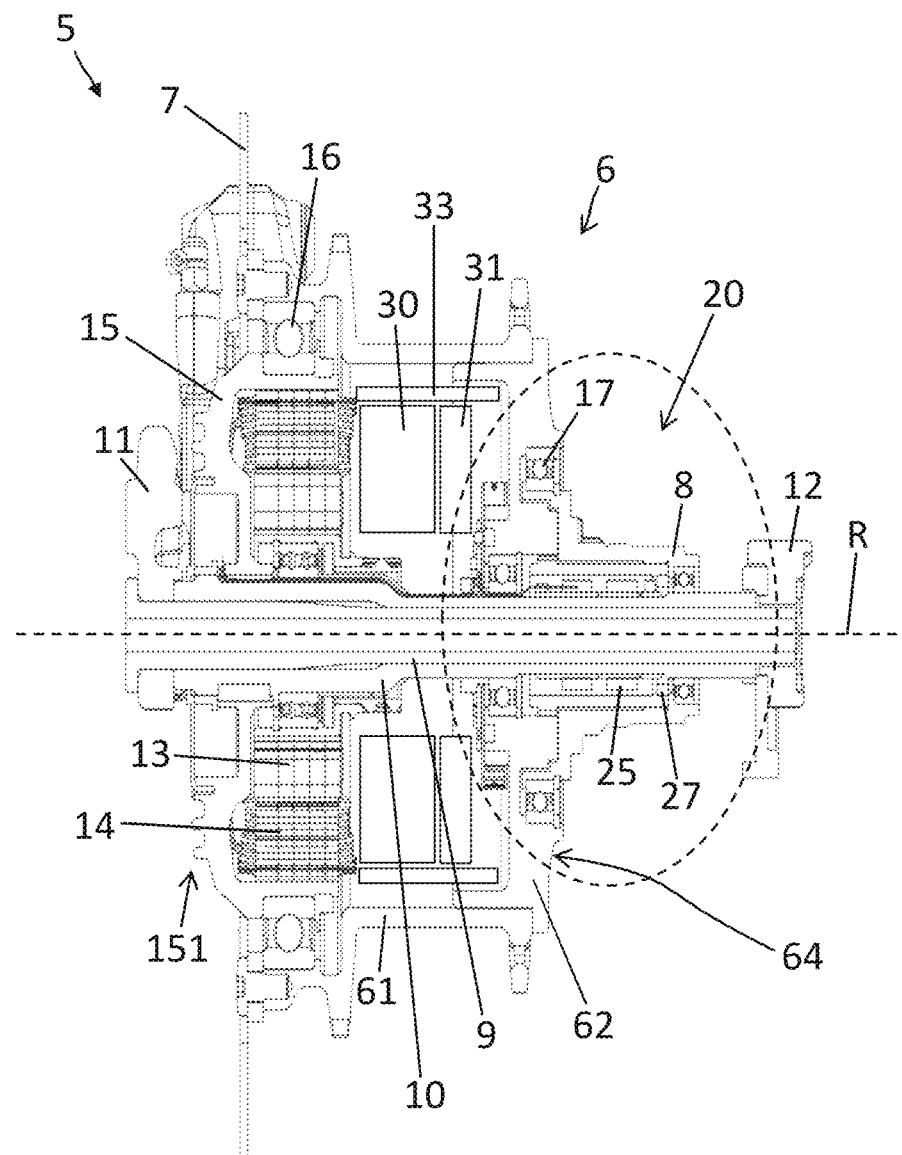
Figure 4:
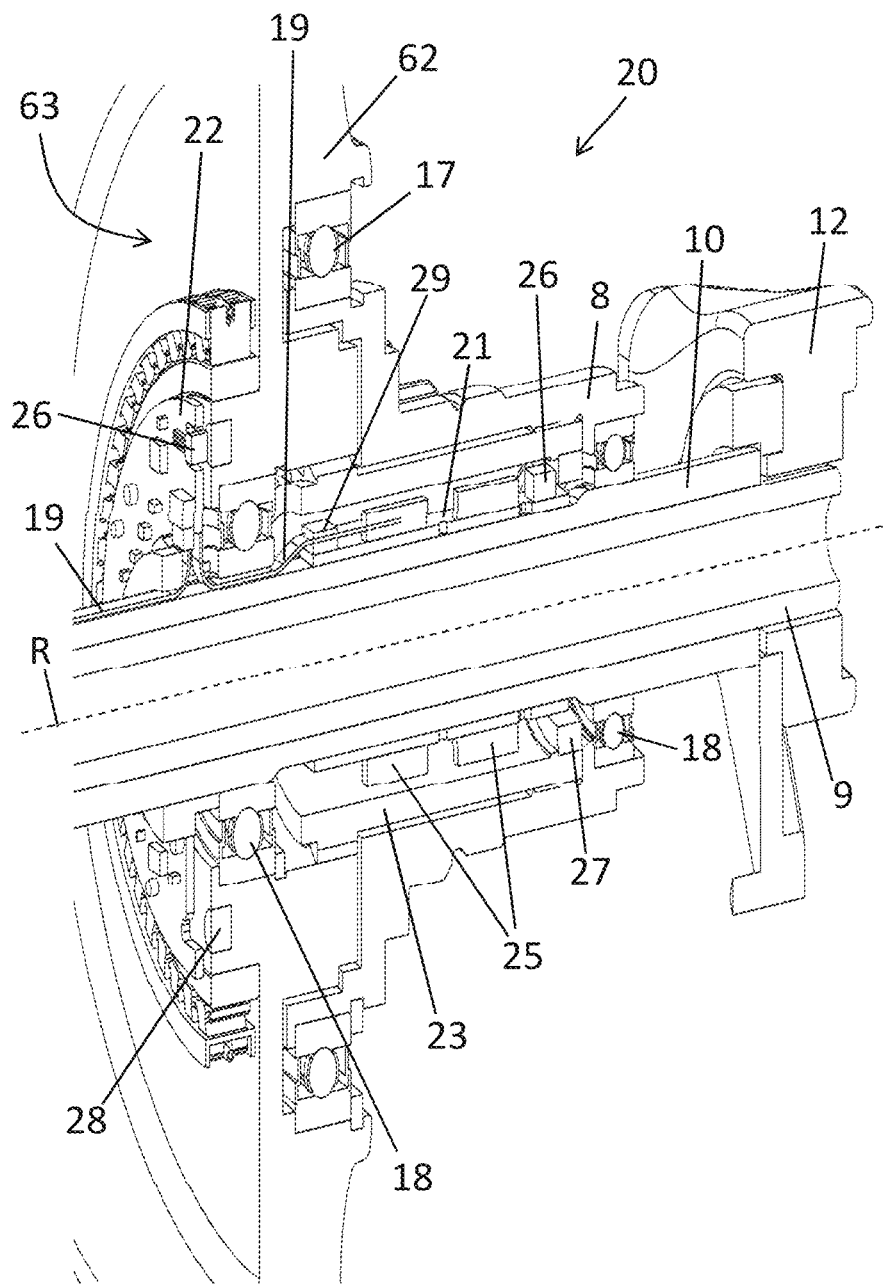
Figure 5:
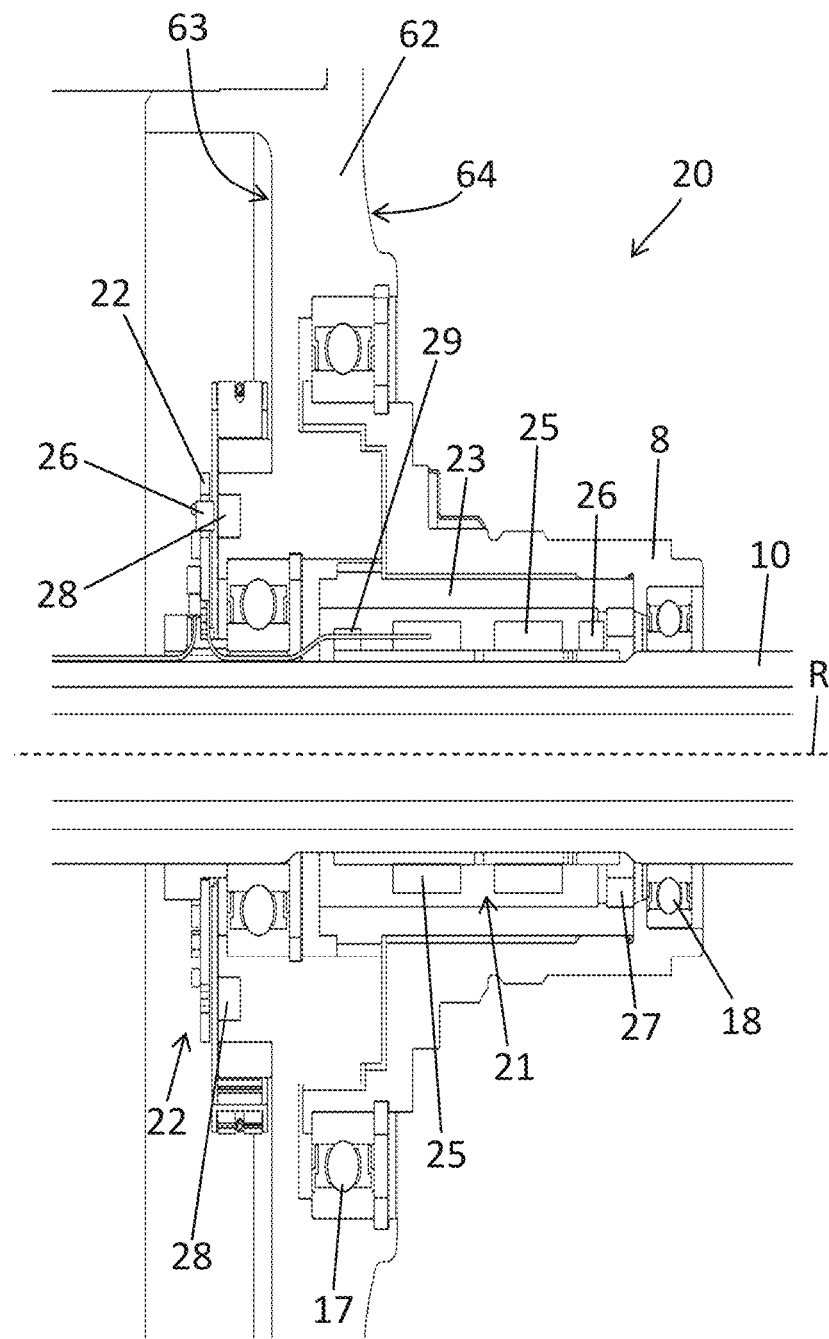

FIGS. 2-5 schematically show, in various sectional views, an embodiment of the drive device 5 for the electric bicycle 1. FIGS. 4 and 5 show the circled area dashed in FIG. 3 enlarged. The drive device 5 comprises a motor unit with an electric motor for driving the electric bicycle 1. The electric motor is designed as a ring motor with respect to a rotation axis R and has a rotor 13 and a stator 14, which provide a drive torque in rotational interaction. With respect to the axis of rotation R, the rotor 13 is arranged radially inwardly and the stator 14 radially outwardly within a motor housing.

The drive device 5 further comprises a hub axle, which is formed in two parts and comprises a stub axle 9 and a drive axle 10, which are coupled to the electric motor. The stub axle 9 and the drive axle 10 are sleeve-shaped, and the stub axle 9 extends through the drive axle 10 so that respective end portions of the stub axle 9 protrude from the drive axle 10.

The drive device 5 further comprises a gearbox, which is configured to drive the electric bicycle 1 and is rotatably mounted about the axis of rotation R. The gearbox is preferably designed as a planetary gearbox 30 and is arranged axially adjacent to the electric motor in the motor housing. The planetary gear 30 comprises at least one sun gear and at least one planet gear and may further be coupled to at least one ring gear 33, a planet carrier 31 and/or a freewheel 32 or comprise such components. The planetary gear 30 is coupled on the one hand to the electric motor and on the other hand to the hub axle, and is arranged to output a torque for driving the electric bicycle 1.

The drive device 5 further comprises the motor housing, which comprises a circumferential housing 6 having a first housing element 61 and a second housing element 62 and a stator cover 15 (see FIGS. 2-3). The second housing element 62 forms a lateral closure of the housing 6 and has an opening through which the hub axle extends. The hub axle with the stub axle 9 and the drive axle 10 extends through the housing element 62, the housing section 6, the gearbox, the ring motor and the stator cover 15. The electric motor and in particular the stator 14 are shielded from the outside only by an adjacent wall of the stator cover 15. An outer side of the wall thus adjoins the outer area, at least in sections, and can have ambient air flowing directly around it. Thus, heat generated by the electric motor during operation of the electric bicycle 1 can be conducted to the outer region by direct heat conduction through the wall and dissipated to the ambient air by radiation and convection. By means of heat conduction, the heat can then additionally be dissipated from the housing into the spokes.

The stator cover 15 has the shape of a bell and is arranged on the left side and extends through a recess of the brake disc 7. The left side of the drive device 5 shown in FIGS. 2 and 3, on which the brake disc 7 is arranged, can also be referred to as the non-drive side. The illustrated right side of the drive device 5, on which the cassette body 8 is arranged, can also be referred to as the drive side. The brake disk 7 is attached to the circumferential housing 6, in particular screwed tight. Due to the axial displacement of the electric motor and the stator cover 15, axial installation space is available inside the drive device 5 for the other or further components of the drive device 5.

In particular, the stator cover 15 is not enclosed on its axial outer side by the surrounding housing 6, so that particularly efficient heat dissipation is set up. The heat introduced by the stator 14 into the stator cover 15 can be dissipated by means of heat conduction through the wall directly to the circulating air of the outer area. Within the drive device 5, heat is transferred from the stator 14 to the stator cover 15 mainly by means of heat conduction, but also by means of convection and thermal radiation. From the stator cover 15, the heat is then transferred to the ambient air by means of convection and radiation. Furthermore, the stator cover 15 may additionally have a cooling structure 151 on an outer surface with a plurality of fins spaced apart from each other to provide an increased surface area and contribute to more efficient heat dissipation.

The stator cover 15 and the motor housing, respectively, are preferably made of or comprise aluminium. Aluminium, for example, has significantly higher thermal conductivity compared to steel and also has weight advantages. Alternatively or additionally, one or more of the previously described components could be made of magnesium or have magnesium, so that a low weight and reliable thermal conductivity of the drive device 5 can be achieved.

The rotor 13 is supported on the stationary or rotationally fixed drive axle 10 by means of one or more bearings 18, and transmits a drive torque to the downstream planetary gear 30. For example, the driver's drive torque is transmitted from a sprocket assembly to the cassette body 8, to the measuring sleeve 23, to a ratchet freewheel between the measuring sleeve 23 and the second housing element 62, to the second housing element 62, and then to the spokes of the electric bicycle 1.

The planetary gear 30 converts speed and torque, and the converted torque can be output, with a drive by the sun gear, either through the planet carrier 31 or through the ring gear 33 to the circumferential housing section 6 and/or the housing element 62. Between the output, which is set up by the ring gear 33 and/or the planet carrier 31, and the circumferential housing section 6, 62, the freewheel 32 may still be provided for decoupling a drive train during operation of the electric bicycle 1 without assistance from the electric motor.

The drive device 5 further comprises a brake disc 7 on one side and a cassette body 8 on the other side of the drive device 5 with respect to the axial arrangement of the components along the axis of rotation R. The brake disc 7 is used for braking the electric bicycle 1 and is fixedly coupled, for example screwed, to the circumferential housing section 6. The cassette body 8 is coupled to the circumferential housing section 6, 62 as a sprocket carrier by means of a bearing 17. With respect to the axis of rotation R, the cassette body 8 surrounds the drive axle 10 and the stub axle 9 and is adapted to transmit a torque of a rider of the electric bicycle 1 to the motor housing.

The driving torque of the rider is transmitted through the cassette body 8 to the circumferential housing elements 61, 62. The cassette body 8 also includes or surrounds a sensor unit 20 of the drive device 5, which includes sensor means for measuring the rider torque. The hub axle and housing element 62 may be associated with the sensor unit 20. Further, the sensor unit 20 comprises two separate circuit boards. A first circuit board 21 is disposed within a measuring sleeve 23 on the drive axle 10 and includes coils 25 and a Hall sensor 26 that, in cooperation with a pole ring element 27, enables a speed or torque of the cassette body 8 to be determined. The pole ring element 27 is arranged at one end of the measuring sleeve 23 in coordination with the Hall sensor 26 and rotates with the measuring sleeve 23, the cassette body 8 and the housing 6 about the hub axle and the first printed circuit board 21 mounted thereon.

A second printed circuit board 22 is annularly formed and coupled to an inner side 63 of the housing element 62, which defines an inner space of the motor housing. The second printed circuit board 22 is fixed to the fixed drive axle 10 by means of a fixing element. The second circuit board 22 surrounds the hub axle and is signal coupled to the first circuit board 21 by means of electrical leads 19 and a coupling interface 29. The electrical lead 19, which leads from the second printed circuit board 22 to the coupling interface 29, can be routed between the drive axle 10 and a bearing 18 in a space-saving and securely held manner. The printed circuit boards 21, 22 are arranged on opposite sides of the housing element 62 and are coupled to and at least partially surround the hub axle with respect to the axis of rotation R.

The first circuit board 21 is arranged closer to an outer side 64 of the housing element 62 than to the inner side 63, and the first circuit board 21 may therefore be referred to as an outer circuit board since it is arranged outside the motor housing. The second printed circuit board 22 may also be referred to as the inner printed circuit board, since it is arranged inside the motor housing. The separate circuit boards 21, 22 are arranged to detect a torque of a rider of the electric bicycle 1. For example, the first circuit board 21 is used for sensors and the second circuit board 22 comprises evaluation electronics. In addition, the second printed circuit board 22 may also comprise a Hall sensor 26 which, in cooperation with one or more magnets 28, enables a speed or a torque of the housing 6 to be determined. The magnets 28 are, for example, arranged as permanent magnets at predetermined positions on the inner side 63 of the housing element 62 or integrated in the inner side 63.

The first printed circuit board 21 is arranged with respect to a radial direction transverse to the axis of rotation R between the cassette body 8 or the measuring sleeve 23 and the drive axis 10. This can be made possible, in particular in a space-saving manner, by the hub axle tapering towards a central section 103 with the insertion axis 9 and the drive axle 10. The drive axle 10 has two end sections 101 and 102, between which the narrower middle section 103 is formed. Thus, the first printed circuit board 21 can be arranged in a particularly space-saving manner and enables a narrow or slim structure of the measuring sleeve 23 and the cassette body 8. The cassette body 8 can also be decoupled from the circumferential housing by a freewheel. The freewheel is realized, for example, as a pawl freewheel or a toothed disk freewheel. In FIG. 2, only the described sections 101, 102 and 103 of the drive axle 10 are illustrated for reasons of clarity. However, the described properties and features can be transferred analogously to three sections of the stub axle 9, which are formed consecutively and can follow an inner contour of the drive axle 10.

The sensor unit 20 is based on a magnetostrictive measuring principle. The measuring sleeve 23 is made of, for example, steel and is of permanent magnet design. Alternatively, it can also be formed ferromagnetically and can be electrically magnetized by a coil. A torsional moment twists the measuring sleeve 23 so that the magnetic field in the measuring sleeve 23 changes. Such a magnetic field change is proportional to the torque and can be detected with the aid of the coils 25 in the first printed circuit board 21.

The stub axle 9 is adapted to be coupled, in particular bolted, at opposite ends to outer frame elements 11 and 12 of the bicycle frame 2 of the electric bicycle 1. Between the two frame elements 11 and 12, on the drive side, the fixed drive axle 10 is provided, on which both the rotating housing 6 and the rotor 13 and the cassette body 8 are mounted by means of two bearings 16 and 17 and/or further bearings 18. The stationary drive axle 10 is designed to provide a required stiffness to support the forces acting on it during operation. Bearing 16 and center bearing 18 (see FIG. 2)

may be referred to as main bearings and, in addition, other bearings 18 or bearing 17 may be referred to as further bearings. Technically, the bearings 16, 17 and 18 are configured to act in particular in the same way and experience position-dependent forces and/or serve position-dependent functions essentially due to their installation position in the drive device 5. Accordingly, an acting radial force is transmitted into the housing 6 and through the second housing element 62 to the bearing 18, then into the drive axle 10 and the stub axle 9 and onto the second frame element 12. The further bearing 18 serves, for example, the freewheel body and at this position essentially no radial forces are introduced by the driver. The remaining bearings 17 and the right-hand bearing 18 (see FIG. 2) support the freewheel body and thus, for example, a chain hoist.

The fixed drive axle 10 is hollow so that there is space inside for the stub axle 9, which is screwed into the right-hand dropout with a narrower end section in the second frame element 12 of the bicycle frame 2 and thus braces the two frame elements 11, 12 against the fixed drive axle 10. The stub axle 9 is preferably not designed with a uniform diameter, but tapers towards the right dropout end, so that the drive axle 10 can also be designed narrower in the central section 103 in order to provide installation space for the sensor unit 20 or the first printed circuit board 21 of the sensor unit 20.

By means of the drive device 5, a particularly space-saving and narrow drive concept can be provided, which also enables efficient and directed heat dissipation. Furthermore, a beneficial axle standard can be provided, which can have a beneficial effect on a rigidity and a customer acceptance by using the two-part hub axle with the plug-in lug 9 and the drive axle 10. The drive device 5 is particularly suitable for mounting to the rear bicycle hub 3 and provides a beneficial drive system, particularly with respect to high efficiency.

What is claimed is:

1. A sensor unit comprising:
   a hub axle connectable to an electric motor of a drive device of an electric bicycle;
   a housing element rotatable about an axis of rotation and configured to form a part of a motor housing for the electric motor, wherein the housing element is coupled to the hub axle and comprises an opening through which the hub axle extends; and
   a first printed circuit board and a second printed circuit board, which are configured to determine a torque of a rider of the electric bicycle and which are coupled to one another in terms of signal technology,
   wherein the printed circuit boards are coupled to the hub axle on opposite sides of the housing element and at least partially surround the hub axle with respect to the axis of rotation.

2. The sensor unit according to claim 1, further comprising:
   a measuring sleeve having a magnetic pole ring element coupled to the housing element and being rotatable about the axis of rotation, and through which the hub axle extends,
   wherein the measuring sleeve surrounds the first printed circuit board such that the first printed circuit board is disposed with respect to a radial direction transverse to the axis of rotation between a sensing sleeve and the hub axle.

3. The sensor unit according to claim 2, wherein the first printed circuit board comprises a coil and a Hall sensor, which are configured to cooperate with the pole ring element in an operation of the drive device for determining the torque of the rider of the electric bicycle.

4. The sensor unit according to claim 1, wherein the second printed circuit board faces an inner side of the housing element, which, with respect to a state in which the sensor unit is installed in the drive device, delimits an inner space of the motor housing for the electric motor.

5. The sensor unit according to claim 4,
   wherein the second printed circuit board comprises a Hall sensor, and
   wherein a magnet is predeterminedly arranged on the inner side of the housing element such that the Hall sensor of the second printed circuit board and the magnet are configured to cooperate in an operation of the drive device for detecting the torque of the rider of the electric bicycle.

6. The sensor unit according to claim 1, wherein the second printed circuit board is annular and surrounds the hub axle at least in sections with respect to the axis of rotation.

7. The sensor unit according to claim 1, wherein the first and second printed circuit boards are coupled to one another in terms of the signal technology in a region of the opening of the housing element by a coupling interface.

8. The sensor unit according to claim 1,
   wherein the hub axle along the axis of rotation has a first end section, a second end section and a middle section arranged therebetween,
   wherein the end sections are configured to be coupled on opposite sides to a respective frame member with respect to the axis of rotation,
   wherein the middle section is formed narrower than the first end section and/or the second end section, and
   wherein the first printed circuit board is arranged in the narrower middle section.

9. The drive device comprising:
   a motor unit having the electric motor configured to drive the electric bicycle;
   a gearbox which is rotatable about the axis of rotation, which is coupled to the electric motor and to the hub axle, and which is configured to output the torque for driving the electric bicycle;
   the motor housing in which the electric motor and the gearbox are arranged; and
   the sensor unit according to claim 1, which is coupled to the electric motor by the hub axle,
   wherein the housing element is the part of the motor housing and the hub axle extends through the motor housing.

10. The drive device according to claim 9, further comprising:
    a cassette body, which is coupled to the housing element, which surrounds the hub axle with respect to the axis of rotation, and which is arranged to transmit the torque of the rider of the electric bicycle to the housing element, wherein the cassette body surrounds the first printed circuit board so that the first printed circuit board is arranged between the cassette body and the hub axle with respect to a radial direction transverse to the axis of rotation.

11. The drive device according to claim 9, wherein the electric motor comprises a rotor and a stator, and wherein the stator is arranged in direct proximity to a wall of the motor housing.

12. The drive device according to claim 9, wherein the motor housing has a cooling structure comprising a plurality of fins spaced apart from each other on an outer side of the motor housing.

13. The drive device according to claim 9,
- wherein the motor housing has two parts and comprises a circumferential housing portion and a stator cover rotatably coupled to each other with respect to the axis of rotation by a bearing,
- wherein, with respect to the axis of rotation, the stator cover is rotationally fixed and the housing portion is rotationally coupled to the hub axle, and
- wherein the stator cover extends along the axis of rotation axially to an outside of the housing portion.

14. The drive device according to claim 9, further comprising:
- first and second frame members arranged on opposite sides outside the motor housing with respect to the axis of rotation and surrounding the hub axle,
- wherein the hub axle has two parts and comprises a stub axle and a drive axle, and
- wherein the two frame members are configured to predefinedly brace the drive axle in cooperation with the stub axle.

15. The electric bicycle comprising:
- a bicycle frame extending to a bottom bracket and to a bicycle hub; and
- the drive device according to claim 9 coupled to the bicycle hub for driving the electric bicycle.

* * * * *